United States Patent
Blazek

[15] 3,675,708
[45] July 11, 1972

[54] METHOD OF MAKING ACCURATE CORES

[72] Inventor: William S. Blazek, Alliance, Ohio
[73] Assignee: TRW Inc., Cleveland, Ohio
[22] Filed: Dec. 16, 1970
[21] Appl. No.: 98,571

[52] U.S. Cl. ................................164/35, 164/246, 164/247
[51] Int. Cl. ...........................................................B22c 9/02
[58] Field of Search .......................................164/34, 35, 36

[56] References Cited

UNITED STATES PATENTS 3,424,227   1/1969   Watts et al..............................164/36

Primary Examiner—J. Spencer Overholser
Assistant Examiner—V. K. Rising
Attorney—Hill, Sherman, Meroni, Gross & Simpson

[57] ABSTRACT

Method for making shell-type cores which involves joining together a plurality of core patterns which when joined provide a hollow composite pattern, each of the patterns having ribs extending therealong. The composite pattern is invested in a ceramic mold making material to form outer and inner ceramic shells about the composite pattern. A portion of the outer shell is then removed to expose at least a portion of the ribs. Upon melting out of the pattern, the discontinuity created by the presence of the ribs causes the outer shell to come apart and leaves the inner shell intact. The inner shell which is in the configuration of the desired core is then fired to provide a rigid shell-type core.

6 Claims, 5 Drawing Figures

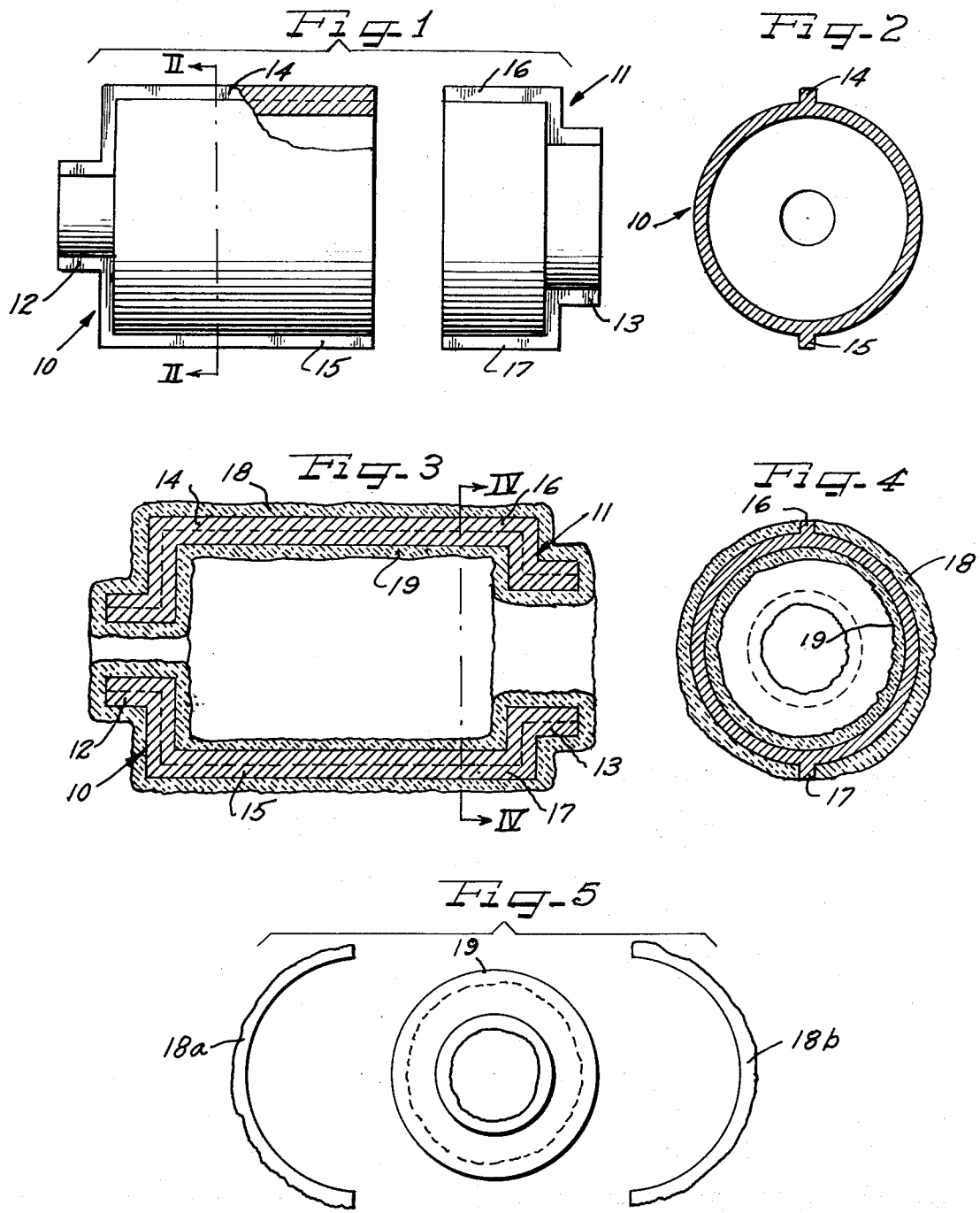

METHOD OF MAKING ACCURATE CORES

BACKGROUND OF THE INVENTION

1. Field of the Invention

This invention is in the field of making ceramic type cores for use in precision investment casting processes and involves forming inner and outer shells about a composite pattern, simultaneously removing the composite pattern and the outer shell, and then firing the remaining inner shell to produce a rigid shell-type core.

2. Description of the Prior Art

In the manufacture of complex castings having passages or voids therein which must meet close tolerances, it is common practice to employ preformed ceramic cores in the investment mold. The problem of securing cores with suitable accuracy and dimensions and with the smooth surface finish required poses a problem particularly in the case of large cores.

Preformed ceramic cores are usually made either from fused silica tubing or by pressing or molding powdered or granular refractory material into the required shape and firing it. In the case of molding the preformed core, the mold used must be as dimensionally accurate as the tooling for producing the patterns, and should be hardened to resist the abrasive wear caused by the injection of ceramic material. All of these factors add considerably to the cost of the overall operation.

SUMMARY OF THE INVENTION

In accordance with the present invention, a ceramic core is produced by first providing a composite pattern made up of two or more disposable pattern sections. These sections are joined by means of heat or solvent welding, and each section is provided with a rib running lengthwise of the section. The ribs on the joined sections merge to form a continuous rib running the length of the composite pattern.

The composite pattern is then dipped into suitable ceramic slurries to build up thin ceramic shells on the interior and the exterior of the pattern surfaces. After drying, a portion of the exterior shell thus produced is removed in the vicinity of the rib, thereby exposing at least a portion of the rib along the length of the shells. The pattern material is then melted out, causing the outer shell to come apart and leaving the inner shell which, upon firing, becomes a rigid ceramic core suitable for use as a preformed core in subsequent mold making processes.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel disclosure, and in which:

FIG. 1 is a view in elevation illustrating two wax patterns which are combined to form the composite pattern;

FIG. 2 is a cross-sectional view taken substantially along the line II—II OF FIG. 1;

FIG. 3 is a cross-sectional view of the composite pattern after it has been invested with a ceramic mold making material so as to form inner and outer ceramic shells about the pattern;

FIG. 4 is a cross-sectional view taken along the line IV—IV of FIG. 3, after a portion of the outer shell has been removed to expose the ribs in the composite pattern; and FIG. 5 is an end view of the completed core, showing the manner in which the outer shell is broken away during melting of the pattern material.

DESCRIPTION OF THE PREFERRED EMBODIMENTS

In FIG. 1, there is illustrated a pair of pattern sections 10 and 11 which, when combined, form a composite pattern having the shape desired in the finished core of the present invention. As illustrated, pattern section 10 has a relatively small diameter end portion 12 which forms a core print for one end of the core, and the pattern section 11 has a relatively larger diameter end portion 13 forming a core print for that end of the core.

The pattern section 10 has a pair of ribs 14 and 15 on its periphery extending longitudinally along the surface thereof. Similarly, the pattern section 11 has a pair of ribs 16 and 17 also extending along the longitudinal dimension. When the two pattern sections 10 and 11 are put together, the ribs 14 and 16, as well as the ribs 15 and 17 abut to form a continuous rib on both sides of the resulting composite pattern. The two pattern sections 10 and 11 may be joined together by heat in the case of wax, or they may be solvent welded in the event a plastic pattern material such as polystyrene is employed.

The resulting composite pattern is then dipped successively into ceramic slurry compositions, with intermediate drying, in order to build up an outer shell 18 surrounding the outer periphery of the pattern and the ribs, and an inner shell 19 interiorly of the hollow composite pattern. The ceramic slurries which are used to build up such shells are well known in the art and do not form a novel feature of the present invention. By way of illustration, however, such slurries may contain fused silica, zircon, or other refractory materials in combination with binders. Chemical binders such as ethyl silicate, sodium silicate and colloidal silica have been used very extensively. The coating material may also contain other additives to perform specific functions. For example, the slurry may contain a film former such as an alginate to control viscosity. A wetting agent may be included to control flow characteristics and pattern wettability. An anti-foam agent such as a silicone emulsion may be used to remove entrapped air. An anti-drying agent such as gelatin can be added to control drying and reduce shrinkage cracks.

The initial coating applied to the pattern contains very finely divided refractory material, to produce an accurate surface finish. A typical slurry for a first coat might contain 29 percent of a colloidal silica suspension in the form of a 20 to 30 percent concentrate. Fused silica of a particle size of 325 mesh or smaller in an amount of 71 percent can be employed, together with less than one-tenth percent by weight of a wetting agent. Generally, the specific gravity of such a slurry is on the order of 1.75 to 1.80 and has a viscosity of 40 to 60 seconds when measured with a Number 5 Zahn cup at 75° to 85° F.

After application of the initial coating, the surface is stuccoed with refractory materials having particle sizes on the order of 60 to 200 mesh.

Each coat is dried before subsequent dipping in succeeding ceramic slurries. Generally, from three to eight dips are employed to build up a thickness of one-eighth to one-half inch.

When the outer or inner shells 18 and 19 have been built up to a suitable thickness, and dried, the shells are self-sustaining but not rigid. At this stage, the outer shell 18 is ground or otherwise abraded to expose at least a portion of the ribs as shown in FIG. 4 of the drawings. The grinding away of the shell material about the ribs thus leaves the outer shell discontinuous along the parting lines provided by the composite ribs 14–16 and 15–17.

The next step consists in removing the pattern material, typically by firing it in a furnace or by treating it in an autoclave. When the pattern material liquefies, the liquid material flows from between the two shells, so that the outer shell separates into two sections 18a and 18b, as illustrated in FIG. 5, leaving the inner shell 19. The outer surface of the shell 19 is very smooth and requires no additional surface treatment. The shell is formed into a finished ceramic core by firing the same at firing temperatures which usually range from about 1,500° to 1,900° F. The rigid ceramic shell thus produced is then usable in other mold making processes, such as by injecting additional amounts of pattern material about it to eventually form the finished mold structure.

With the type of preformed core employed in the present invention, it is convenient to make the core with physical properties different from the remainder of the refractory shell in which it is ultimately included. For example, it can be made stronger, more leachable or have different dimensional expansion characteristics from the rest of the refractory shell. The biggest advantage is the obtainment of an excellent surface finish and dimensional accuracy in an inexpensive process. Another advantage resides in the fact that the preformed core is easily inspected and repaired if defects are found. The size range for the core is unlimited, and it can be easily handled. The process of making the core is considerably less expensive than the more conventional methods now used for the manufacture of preformed ceramic cores.

I claim as my invention:

1. The method of making a shell-type core which comprises joining together a plurality of core patterns which when joined provide a hollow composite pattern, said patterns each having ribs extending from the peripheries thereof, investing the composite pattern in a ceramic mold making material to form outer and inner ceramic shells about said composite pattern, removing a portion of the outer shell to thereby expose at least a portion of said ribs, melting out the pattern to thereby cause the outer shell to come apart and leaving the inner shell intact, and firing the inner shell to provide a rigid shell-type core.

2. The method of claim 1 in which said ribs extend longitudinally of said patterns.

3. The method of claim 1 in which said ribs are positioned to provide a continuous rib extending the length of the composite pattern.

4. The method of claim 1 in which said pattern is composed of wax.

5. The method of claim 1 in which said pattern is composed of polystyrene.

6. The method of claim 1 in which said core patterns are joined together by heat.

* * * * *